United States Patent
Mosko et al.

(10) Patent No.: US 9,959,156 B2
(45) Date of Patent: May 1, 2018

(54) INTEREST RETURN CONTROL MESSAGE

(71) Applicant: CISCO TECHNOLOGY, INC., San Jose, CA (US)

(72) Inventors: Marc E. Mosko, Santa Cruz, CA (US); Ignacio Solis, South San Francisco, CA (US); Ersin Uzun, Campbell, CA (US)

(73) Assignee: Cisco Technology, Inc., San Jose, CA (US)

(*) Notice: Subject to any disclaimer, the term of this patent is extended or adjusted under 35 U.S.C. 154(b) by 221 days.

(21) Appl. No.: 14/334,530

(22) Filed: Jul. 17, 2014

(65) Prior Publication Data
US 2016/0019110 A1 Jan. 21, 2016

(51) Int. Cl.
*G06F 15/16* (2006.01)
*G06F 11/07* (2006.01)
(Continued)

(52) U.S. Cl.
CPC ...... *G06F 11/0784* (2013.01); *G06F 11/0709* (2013.01); *H04L 45/28* (2013.01); *H04L 45/74* (2013.01); *G06F 11/0766* (2013.01); *G06F 11/0775* (2013.01); *G06F 11/0793* (2013.01); *H04L 41/06* (2013.01);
(Continued)

(58) Field of Classification Search
CPC ....... H04L 41/06; H04L 45/28; H04L 49/555; H04L 49/557; H04L 41/0677; H04L 41/0681; H04L 41/0686; H04L 43/0847; G06F 11/0703; G06F 11/0784;
(Continued)

(56) References Cited

U.S. PATENT DOCUMENTS 817,441 A 4/1906 Niesz
4,309,569 A 1/1982 Merkle
(Continued)

FOREIGN PATENT DOCUMENTS

DE 1720277 A1 6/1967
DE 19620817 A1 11/1997
(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.
(Continued)

*Primary Examiner* — Liangche A Wang
*Assistant Examiner* — Johnny Aguiar

(57) ABSTRACT

One embodiment provides a system that facilitates processing of error-condition information associated with a content-centric network (CCN) message transmitted over a network. During operation, the system receives, by a first node, a packet that corresponds to a CCN message, where a name for the CCN message is a hierarchically structured variable length identifier (HSVLI) which comprises contiguous name components ordered from a most general level to a most specific level. Responsive to determining that the CCN message triggers an error condition, the system generates an interest return message by pre-pending a data structure to the CCN message, where the data structure indicates the error condition. The system transmits the interest return message to a second node.

19 Claims, 9 Drawing Sheets

(51) Int. Cl.
*H04L 12/741* (2013.01)
*H04L 12/703* (2013.01)
*H04L 12/26* (2006.01)
*H04L 12/939* (2013.01)
*H04L 12/24* (2006.01)

(52) U.S. Cl.
CPC ........ *H04L 43/0847* (2013.01); *H04L 49/555* (2013.01); *H04L 49/557* (2013.01)

(58) Field of Classification Search
CPC ............. G06F 11/0709; G06F 11/0766; G06F 11/0775; G06F 11/0793
USPC ....... 709/217, 219, 223, 224, 238, 239, 242, 709/243, 245; 370/216, 242, 389, 392
See application file for complete search history.

(56) References Cited

U.S. PATENT DOCUMENTS

| | | | |
|---|---|---|---|
| 4,921,898 A | 5/1990 | Lenney | |
| 5,070,134 A | 12/1991 | Oyamada | |
| 5,110,856 A | 5/1992 | Oyamada | |
| 5,506,844 A | 4/1996 | Rao | |
| 5,629,370 A | 5/1997 | Freidzon | |
| 5,870,605 A | 2/1999 | Bracho | |
| 6,052,683 A | 4/2000 | Irwin | |
| 6,091,724 A | 7/2000 | Chandra | |
| 6,173,364 B1 | 1/2001 | Zenchelsky | |
| 6,226,618 B1 | 5/2001 | Downs | |
| 6,233,646 B1 | 5/2001 | Hahm | |
| 6,332,158 B1 | 12/2001 | Risley | |
| 6,366,988 B1 | 4/2002 | Skiba | |
| 6,574,377 B1 | 6/2003 | Cahill | |
| 6,654,792 B1 | 11/2003 | Verma | |
| 6,667,957 B1 | 12/2003 | Corson | |
| 6,681,220 B1 | 1/2004 | Kaplan | |
| 6,681,326 B2 | 1/2004 | Son | |
| 6,769,066 B1 | 7/2004 | Botros | |
| 6,772,333 B1 | 8/2004 | Brendel | |
| 6,775,258 B1* | 8/2004 | van Valkenburg | H04L 45/00 370/338 |
| 6,862,280 B1 | 3/2005 | Bertagna | |
| 6,901,452 B1 | 5/2005 | Bertagna | |
| 6,917,985 B2 | 7/2005 | Madruga | |
| 6,968,393 B1 | 11/2005 | Chen | |
| 6,981,029 B1 | 12/2005 | Menditto | |
| 7,013,389 B1 | 3/2006 | Srivastava | |
| 7,031,308 B2 | 4/2006 | Garcia-Luna-Aceves | |
| 7,061,877 B1 | 6/2006 | Gummalla | |
| 7,206,860 B2 | 4/2007 | Murakami | |
| 7,257,837 B2 | 8/2007 | Xu | |
| 7,287,275 B2 | 10/2007 | Moskowitz | |
| 7,315,541 B1 | 1/2008 | Housel | |
| 7,339,929 B2 | 3/2008 | Zelig | |
| 7,350,229 B1 | 3/2008 | Lander | |
| 7,382,787 B1 | 6/2008 | Barnes | |
| 7,444,251 B2 | 10/2008 | Nikovski | |
| 7,466,703 B1 | 12/2008 | Arunachalam | |
| 7,472,422 B1 | 12/2008 | Agbabian | |
| 7,496,668 B2 | 2/2009 | Hawkinson | |
| 7,509,425 B1 | 3/2009 | Rosenberg | |
| 7,523,016 B1 | 4/2009 | Surdulescu | |
| 7,543,064 B2 | 6/2009 | Juncker | |
| 7,552,233 B2 | 6/2009 | Raju | |
| 7,555,482 B2 | 6/2009 | Korkus | |
| 7,555,563 B2 | 6/2009 | Ott | |
| 7,567,547 B2 | 7/2009 | Mosko | |
| 7,567,946 B2 | 7/2009 | Andreoli | |
| 7,580,971 B1 | 8/2009 | Gollapudi | |
| 7,623,535 B2 | 11/2009 | Guichard | |
| 7,647,507 B1 | 1/2010 | Feng | |
| 7,660,324 B2 | 2/2010 | Oguchi | |
| 7,685,290 B2 | 3/2010 | Satapati | |
| 7,698,463 B2 | 4/2010 | Ogier | |
| 7,769,887 B1 | 8/2010 | Bhattacharyya | |
| 7,779,467 B2 | 8/2010 | Choi | |
| 7,801,177 B2 | 9/2010 | Luss | |
| 7,816,441 B2 | 10/2010 | Elizalde | |
| 7,831,733 B2 | 11/2010 | Sultan | |
| 7,908,337 B2 | 3/2011 | Garcia-Luna-Aceves | |
| 7,924,837 B1 | 4/2011 | Shabtay | |
| 7,953,885 B1 | 5/2011 | Devireddy | |
| 8,000,267 B2 | 8/2011 | Solis | |
| 8,010,691 B2 | 8/2011 | Kollmansberger | |
| 8,024,560 B1* | 9/2011 | Alten | H04L 63/0428 713/156 |
| 8,074,289 B1 | 12/2011 | Carpentier | |
| 8,117,441 B2 | 2/2012 | Kurien | |
| 8,160,069 B2 | 4/2012 | Jacobson | |
| 8,204,060 B2 | 6/2012 | Jacobson | |
| 8,214,364 B2 | 7/2012 | Bigus | |
| 8,224,985 B2 | 7/2012 | Takeda | |
| 8,225,057 B1 | 7/2012 | Zheng | |
| 8,271,578 B2 | 9/2012 | Sheffi | |
| 8,312,064 B1 | 11/2012 | Gauvin | |
| 8,386,622 B2 | 2/2013 | Jacobson | |
| 8,467,297 B2 | 6/2013 | Liu | |
| 8,553,562 B2 | 10/2013 | Allan | |
| 8,572,214 B2 | 10/2013 | Garcia-Luna-Aceves | |
| 8,654,649 B2 | 2/2014 | Vasseur | |
| 8,665,757 B2 | 3/2014 | Kling | |
| 8,667,172 B2 | 3/2014 | Ravindran | |
| 8,688,619 B1 | 4/2014 | Ezick | |
| 8,699,350 B1 | 4/2014 | Kumar | |
| 8,750,820 B2 | 6/2014 | Allan | |
| 8,761,022 B2 | 6/2014 | Chiabaut | |
| 8,762,477 B2 | 6/2014 | Xie | |
| 8,762,570 B2 | 6/2014 | Qian | |
| 8,762,707 B2 | 6/2014 | Killian | |
| 8,767,627 B2 | 7/2014 | Ezure | |
| 8,817,594 B2 | 8/2014 | Gero | |
| 8,826,381 B2 | 9/2014 | Kim | |
| 8,832,302 B1 | 9/2014 | Bradford | |
| 8,836,536 B2 | 9/2014 | Marwah | |
| 8,862,774 B2 | 10/2014 | Vasseur | |
| 8,903,756 B2 | 12/2014 | Zhao | |
| 8,937,865 B1 | 1/2015 | Kumar | |
| 9,071,498 B2 | 6/2015 | Beser | |
| 9,112,895 B1 | 8/2015 | Lin | |
| 9,270,598 B1* | 2/2016 | Oran | H04L 67/327 |
| 2002/0010795 A1 | 1/2002 | Brown | |
| 2002/0048269 A1 | 4/2002 | Hong | |
| 2002/0054593 A1 | 5/2002 | Morohashi | |
| 2002/0077988 A1 | 6/2002 | Sasaki | |
| 2002/0078066 A1 | 6/2002 | Robinson | |
| 2002/0138551 A1 | 9/2002 | Erickson | |
| 2002/0176404 A1 | 11/2002 | Girard | |
| 2002/0188605 A1 | 12/2002 | Adya | |
| 2002/0199014 A1 | 12/2002 | Yang | |
| 2003/0046437 A1 | 3/2003 | Eytchison | |
| 2003/0048793 A1 | 3/2003 | Pochon | |
| 2003/0051100 A1 | 3/2003 | Patel | |
| 2003/0074472 A1 | 4/2003 | Lucco | |
| 2003/0097447 A1 | 5/2003 | Johnston | |
| 2003/0140257 A1 | 7/2003 | Paterka | |
| 2004/0024879 A1 | 2/2004 | Dingman | |
| 2004/0030602 A1 | 2/2004 | Rosenquist | |
| 2004/0073715 A1 | 4/2004 | Folkes | |
| 2004/0139230 A1 | 7/2004 | Kim | |
| 2004/0196783 A1* | 10/2004 | Shinomiya | H04L 41/0668 370/216 |
| 2004/0221047 A1 | 11/2004 | Grover | |
| 2004/0225627 A1 | 11/2004 | Botros | |
| 2004/0252683 A1 | 12/2004 | Kennedy | |
| 2005/0003832 A1 | 1/2005 | Osafune | |
| 2005/0028156 A1 | 2/2005 | Hammond | |
| 2005/0043060 A1 | 2/2005 | Brandenberg | |
| 2005/0050211 A1 | 3/2005 | Kaul | |
| 2005/0074001 A1 | 4/2005 | Mattes | |
| 2005/0149508 A1 | 7/2005 | Deshpande | |
| 2005/0159823 A1 | 7/2005 | Hayes | |
| 2005/0198351 A1 | 9/2005 | Nog | |
| 2005/0249196 A1 | 11/2005 | Ansari | |

(56) References Cited

U.S. PATENT DOCUMENTS

| | | | |
|---|---|---|---|
| 2005/0259637 A1 | 11/2005 | Chu | |
| 2005/0262217 A1 | 11/2005 | Nonaka | |
| 2005/0281288 A1* | 12/2005 | Banerjee | H04L 47/10 370/477 |
| 2005/0289222 A1 | 12/2005 | Sahim | |
| 2006/0010249 A1 | 1/2006 | Sabesan | |
| 2006/0029102 A1 | 2/2006 | Abe | |
| 2006/0039379 A1 | 2/2006 | Abe | |
| 2006/0051055 A1 | 3/2006 | Ohkawa | |
| 2006/0072523 A1 | 4/2006 | Richardson | |
| 2006/0099973 A1 | 5/2006 | Nair | |
| 2006/0129514 A1 | 6/2006 | Watanabe | |
| 2006/0133343 A1 | 6/2006 | Huang | |
| 2006/0173831 A1 | 8/2006 | Basso | |
| 2006/0193295 A1 | 8/2006 | White | |
| 2006/0206445 A1 | 9/2006 | Andreoli | |
| 2006/0215684 A1 | 9/2006 | Capone | |
| 2006/0223504 A1 | 10/2006 | Ishak | |
| 2006/0256767 A1 | 11/2006 | Suzuki | |
| 2006/0268792 A1 | 11/2006 | Belcea | |
| 2007/0019619 A1 | 1/2007 | Foster | |
| 2007/0073888 A1 | 3/2007 | Madhok | |
| 2007/0094265 A1 | 4/2007 | Korkus | |
| 2007/0112880 A1 | 5/2007 | Yang | |
| 2007/0124412 A1 | 5/2007 | Narayanaswami | |
| 2007/0127457 A1 | 6/2007 | Mirtorabi | |
| 2007/0160062 A1 | 7/2007 | Morishita | |
| 2007/0162394 A1 | 7/2007 | Zager | |
| 2007/0189284 A1 | 8/2007 | Kecskemeti | |
| 2007/0195765 A1 | 8/2007 | Heissenbuttel | |
| 2007/0204011 A1 | 8/2007 | Shaver | |
| 2007/0209067 A1 | 9/2007 | Fogel | |
| 2007/0239892 A1 | 10/2007 | Ott | |
| 2007/0240207 A1 | 10/2007 | Belakhdar | |
| 2007/0245034 A1 | 10/2007 | Retana | |
| 2007/0253418 A1 | 11/2007 | Shiri | |
| 2007/0255699 A1 | 11/2007 | Sreenivas | |
| 2007/0255781 A1 | 11/2007 | Li | |
| 2007/0274504 A1 | 11/2007 | Maes | |
| 2007/0276907 A1 | 11/2007 | Maes | |
| 2007/0294187 A1 | 12/2007 | Scherrer | |
| 2008/0005056 A1 | 1/2008 | Stelzig | |
| 2008/0010366 A1 | 1/2008 | Duggan | |
| 2008/0037420 A1 | 2/2008 | Tang | |
| 2008/0043989 A1 | 2/2008 | Furutono | |
| 2008/0046340 A1 | 2/2008 | Brown | |
| 2008/0059631 A1 | 3/2008 | Bergstrom | |
| 2008/0080440 A1 | 4/2008 | Yarvis | |
| 2008/0101357 A1 | 5/2008 | Iovanna | |
| 2008/0107034 A1 | 5/2008 | Jetcheva | |
| 2008/0123862 A1 | 5/2008 | Rowley | |
| 2008/0133583 A1 | 6/2008 | Artan | |
| 2008/0133755 A1 | 6/2008 | Pollack | |
| 2008/0151755 A1 | 6/2008 | Nishioka | |
| 2008/0159271 A1 | 7/2008 | Kutt | |
| 2008/0170531 A1* | 7/2008 | Petry | H04L 65/601 370/312 |
| 2008/0186901 A1 | 8/2008 | Itagaki | |
| 2008/0200153 A1 | 8/2008 | Fitzpatrick | |
| 2008/0215669 A1 | 9/2008 | Gaddy | |
| 2008/0216086 A1 | 9/2008 | Tanaka | |
| 2008/0243992 A1 | 10/2008 | Jardetzky | |
| 2008/0256359 A1 | 10/2008 | Kahn | |
| 2008/0270618 A1 | 10/2008 | Rosenberg | |
| 2008/0271143 A1 | 10/2008 | Stephens | |
| 2008/0287142 A1 | 11/2008 | Keighran | |
| 2008/0288580 A1 | 11/2008 | Wang | |
| 2008/0320148 A1 | 12/2008 | Capuozzo | |
| 2009/0006659 A1 | 1/2009 | Collins | |
| 2009/0013324 A1 | 1/2009 | Gobara | |
| 2009/0022154 A1 | 1/2009 | Kiribe | |
| 2009/0024641 A1 | 1/2009 | Quigley | |
| 2009/0030978 A1 | 1/2009 | Johnson | |
| 2009/0037763 A1 | 2/2009 | Adhya | |
| 2009/0052660 A1 | 2/2009 | Chen | |
| 2009/0067429 A1 | 3/2009 | Nagai | |
| 2009/0077184 A1 | 3/2009 | Brewer | |
| 2009/0092043 A1 | 4/2009 | Lapuh | |
| 2009/0097631 A1 | 4/2009 | Gisby | |
| 2009/0103515 A1 | 4/2009 | Pointer | |
| 2009/0113068 A1 | 4/2009 | Fujihira | |
| 2009/0135728 A1* | 5/2009 | Shen | H04L 43/12 370/250 |
| 2009/0144300 A1 | 6/2009 | Chatley | |
| 2009/0157887 A1 | 6/2009 | Froment | |
| 2009/0185745 A1 | 7/2009 | Momosaki | |
| 2009/0193101 A1 | 7/2009 | Munetsugu | |
| 2009/0198832 A1* | 8/2009 | Shah | H04L 41/0668 709/239 |
| 2009/0222344 A1 | 9/2009 | Greene | |
| 2009/0228593 A1 | 9/2009 | Takeda | |
| 2009/0254572 A1 | 10/2009 | Redlich | |
| 2009/0268905 A1 | 10/2009 | Matsushima | |
| 2009/0285209 A1 | 11/2009 | Stewart | |
| 2009/0287835 A1 | 11/2009 | Jacobson | |
| 2009/0288163 A1 | 11/2009 | Jacobson | |
| 2009/0292743 A1 | 11/2009 | Bigus | |
| 2009/0293121 A1 | 11/2009 | Bigus | |
| 2009/0300079 A1 | 12/2009 | Shitomi | |
| 2009/0300407 A1 | 12/2009 | Kamath | |
| 2009/0307333 A1 | 12/2009 | Welingkar | |
| 2009/0323632 A1 | 12/2009 | Nix | |
| 2010/0005061 A1 | 1/2010 | Basco | |
| 2010/0027539 A1 | 2/2010 | Beverly | |
| 2010/0046546 A1 | 2/2010 | Ram | |
| 2010/0057929 A1 | 3/2010 | Merat | |
| 2010/0088370 A1 | 4/2010 | Wu | |
| 2010/0094767 A1 | 4/2010 | Miltonberger | |
| 2010/0098093 A1 | 4/2010 | Ejzak | |
| 2010/0100465 A1 | 4/2010 | Cooke | |
| 2010/0103870 A1 | 4/2010 | Garcia-Luna-Aceves | |
| 2010/0124191 A1 | 5/2010 | Vos | |
| 2010/0125911 A1 | 5/2010 | Bhaskaran | |
| 2010/0131660 A1 | 5/2010 | Dec | |
| 2010/0150155 A1 | 6/2010 | Napierala | |
| 2010/0165976 A1 | 7/2010 | Khan | |
| 2010/0169478 A1 | 7/2010 | Saha | |
| 2010/0169503 A1 | 7/2010 | Kollmansberger | |
| 2010/0180332 A1 | 7/2010 | Ben-Yochanan | |
| 2010/0182995 A1 | 7/2010 | Hwang | |
| 2010/0185753 A1 | 7/2010 | Liu | |
| 2010/0195653 A1 | 8/2010 | Jacobson | |
| 2010/0195654 A1 | 8/2010 | Jacobson | |
| 2010/0195655 A1 | 8/2010 | Jacobson | |
| 2010/0217874 A1 | 8/2010 | Anantharaman | |
| 2010/0232402 A1 | 9/2010 | Przybysz | |
| 2010/0232439 A1 | 9/2010 | Dham | |
| 2010/0235516 A1 | 9/2010 | Nakamura | |
| 2010/0246549 A1 | 9/2010 | Zhang | |
| 2010/0250497 A1 | 9/2010 | Redlich | |
| 2010/0250939 A1 | 9/2010 | Adams | |
| 2010/0268782 A1 | 10/2010 | Zombek | |
| 2010/0272107 A1 | 10/2010 | Papp | |
| 2010/0284309 A1 | 11/2010 | Allan | |
| 2010/0284404 A1 | 11/2010 | Gopinath | |
| 2010/0293293 A1 | 11/2010 | Beser | |
| 2010/0322249 A1 | 12/2010 | Thathapudi | |
| 2011/0013637 A1 | 1/2011 | Xue | |
| 2011/0022812 A1 | 1/2011 | vanderLinden | |
| 2011/0055392 A1 | 3/2011 | Shen | |
| 2011/0055921 A1 | 3/2011 | Narayanaswamy | |
| 2011/0090908 A1 | 4/2011 | Jacobson | |
| 2011/0106755 A1 | 5/2011 | Hao | |
| 2011/0145597 A1 | 6/2011 | Yamaguchi | |
| 2011/0145858 A1 | 6/2011 | Philpott | |
| 2011/0153840 A1 | 6/2011 | Narayana | |
| 2011/0161408 A1 | 6/2011 | Kim | |
| 2011/0202609 A1 | 8/2011 | Chaturvedi | |
| 2011/0231578 A1 | 9/2011 | Nagappan | |
| 2011/0239256 A1 | 9/2011 | Gholmieh | |
| 2011/0258049 A1 | 10/2011 | Ramer | |
| 2011/0264824 A1 | 10/2011 | Venkata Subramanian | |
| 2011/0265174 A1 | 10/2011 | Thornton | |
| 2011/0271007 A1 | 11/2011 | Wang | |

(56) References Cited

U.S. PATENT DOCUMENTS

| | | |
|---|---|---|
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0307629 A1* | 12/2012 | Vasseur .................. H04L 45/34 370/228 |
| 2012/0314580 A1 | 12/2012 | Hong |
| 2012/0317307 A1* | 12/2012 | Ravindran .......... H04L 12/6418 709/238 |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0003424 A1* | 1/2014 | Matsuhira ............. H04L 47/365 370/389 |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |
| 2015/0372903 A1* | 12/2015 | Hui .......................... H04L 45/28 370/218 |
| 2015/0373155 A1* | 12/2015 | Singh ...................... H04L 69/08 370/467 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.

Jacobson, Van et al. 'VoCCN: Voice Over Content-Centric Networks.' Dec. 1, 2009. ACM ReArch'09.

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

(56) References Cited

OTHER PUBLICATIONS

"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
B. Lynn$2E.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-Third Annual Joint Conference of the IEEE Computer and Communications Societies, vol. 2, IEEE, 2004.
Cho, Jin-Hee, Ananthram Swami, and Ray Chen. "A survey on trust management for mobile and ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World Wide web. ACM, 2009.
Content Centric Networking Project (CCN) [online], http://ccnx.org/releases/latest/doc/technical, Downloaded Mar. 9, 2015.
Content Mediator Architecture for Content-aware Networks (COMET) Project [online], http://www.comet-project.org/, Downloaded Mar. 9, 2015.
D. Boneh, C. Gentry, and B. Waters "Collusion resistant broadcast encryption with short ciphertexts and private keys." CRYPTO '05 Proceedings of the 25th annual international conference on Advances in Cryptology. pp. 258-275. Aug. 14-18, 2005.
D. Boneh and M. Franklin. Identity-Based Encryption from the Weil Pairing. Advances in Cryptology—CRYPTO 2011, vol. 2139, Springer Berlin Heidelberg (2001).
D.K. Smetters, P. Golle, and J.D. Thornton, "CCNx access control specifications," PARC, Tech. Rep., Jul. 2010.
Dabimoghaddam, Ali, Maziar Mirzazad Barijough, and J. J. Garcia-Luna-Aceves. 'Understanding optimal caching and opportunistic caching at the edgeof information-centric networks.' Proceedings of the 1st international conference on information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
H. Xiong, X. Zhang, W. Zhu, and D. Yao. CloudSeal: End-to$2.
Heckerman, David, John S. Breese, and Koos Rommelse. "Decision-Theoretic Troubleshooting." Communications of the ACM. 1995.

(56) References Cited

OTHER PUBLICATIONS

Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.

(56) References Cited

OTHER PUBLICATIONS

S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Miniconference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hogue et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.

\* cited by examiner

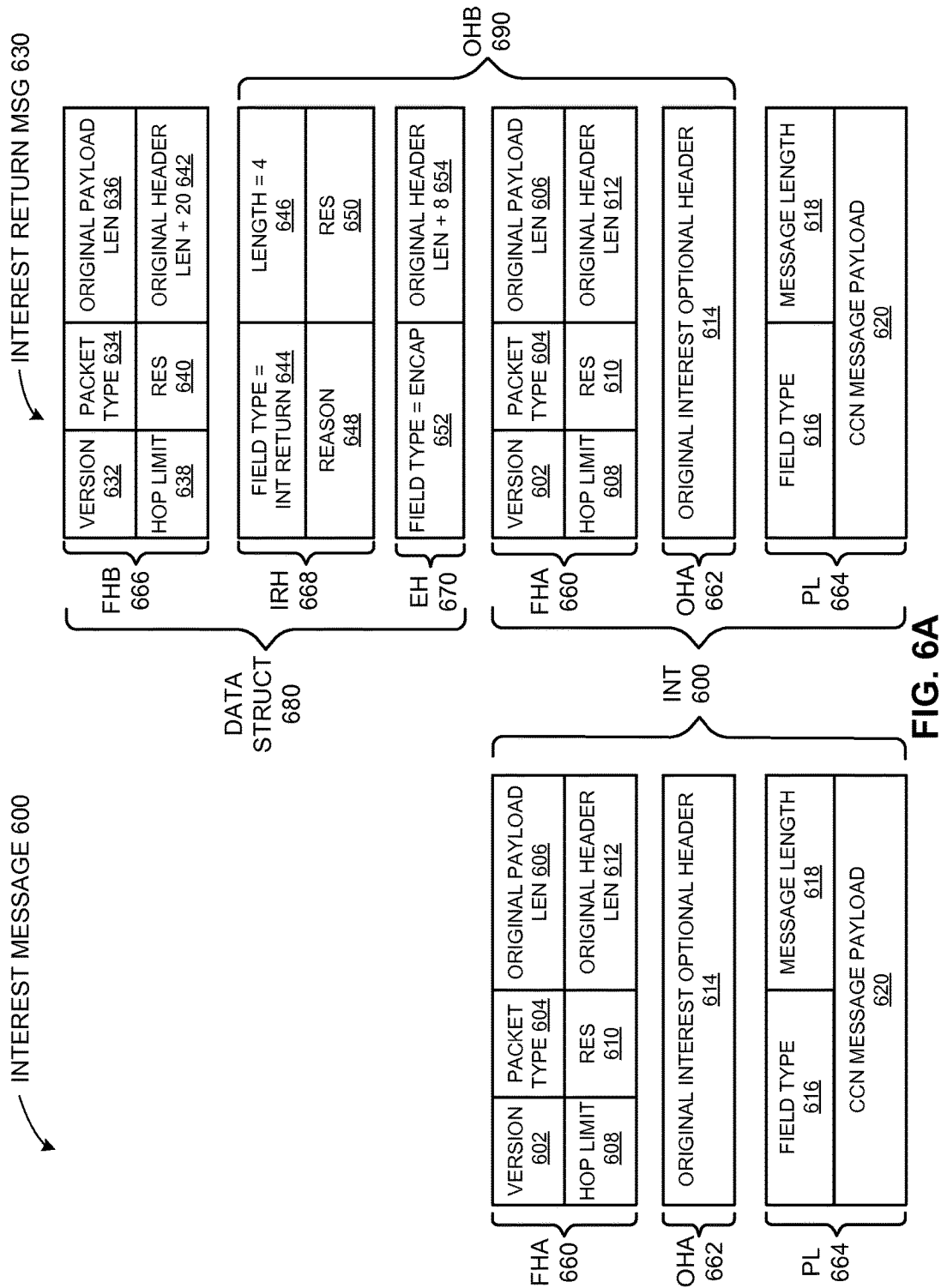

INTEREST RETURN CONTROL MESSAGE

RELATED APPLICATION

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");

U.S. patent application Ser. No. 14/065,691, entitled "SYSTEM AND METHOD FOR HASH-BASED FORWARDING OF PACKETS WITH HIERARCHICALLY STRUCTURED VARIABLE-LENGTH IDENTIFIERS," by inventors Marc E. Mosko and Michael F. Plass, filed 29 Oct. 2013 (hereinafter "U.S. patent application Ser. No. 14/065,691"); and U.S. patent application Ser. No. 14/067,857, entitled "SYSTEM AND METHOD FOR MINIMUM PATH MTU DISCOVERY IN CONTENT CENTRIC NETWORKS," by inventor Marc E. Mosko, filed 30 Oct. 2013 (hereinafter "U.S. patent application Ser. No. 14/067,587");

the disclosures of which are herein incorporated by reference in their entirety.

BACKGROUND

Field

This disclosure is generally related to distribution of digital content. More specifically, this disclosure is related to returning a CCN interest to a previous hop to facilitate processing of error-condition information associated with the interest.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients, forwarders (e.g., routers), and content producers, which communicate with each other by sending "interest" packets for various content items and receiving "content object" packets in return. CCN interests and content objects are identified by their unique names, which are typically hierarchically structured variable length identifiers (HSVLI). An HVLI can include contiguous name components ordered from a most general level to a most specific level.

A CCN node that receives an interest may encounter errors in processing the interest. Such errors can include no available route to forward the interest based on the HSVLI or an administrative prohibition. A network entity, such as a forwarder, that encounters such an error is typically unable to inform the sending CCN node of the error. This creates an inefficiency in the network, as a receiving CCN node could drop the interest without informing the sending node or any other nodes in the reverse routing path of the interest.

SUMMARY

One embodiment provides a system that facilitates processing of error-condition information associated with a content-centric network (CCN) message transmitted over a network. During operation, the system receives, by a first node, a packet that corresponds to a CCN message, where a name for the CCN message is a hierarchically structured variable length identifier (HSVLI) which comprises contiguous name components ordered from a most general level to a most specific level. Responsive to determining that the CCN message triggers an error condition, the system generates an interest return message by pre-pending a data structure to the CCN message, where the data structure indicates the error condition. The system transmits the interest return message to a second node.

In some embodiments, the CCN message is an interest message.

In some embodiments, the system receives, by the second node, the interest return message and determines whether a pending interest table (PIT) contains an entry corresponding to the interest message received as part of the interest return message. Responsive to determining that the PIT contains the corresponding entry, the system removes the corresponding entry from the PIT and forwards the interest return message on a reverse path as the interest.

In some embodiments, determining whether a PIT contains an entry corresponding to the interest message received as part of the interest return message is based on the HSVLI of the interest message.

In some embodiments, the system receives, by the second node, the interest return message and determines whether a pending interest table (PIT) contains an entry corresponding to the interest message received as part of the interest return message. Responsive to determining that the PIT contains the corresponding entry, the system determines whether an alternative forwarding path for the interest exists. Responsive to determining that an alternative forwarding path exists, the system forwards the interest message to the next hop node based on the alternative forwarding path and discards the interest return message.

In some embodiments, the error condition is associated with one or more of: no available forwarding route corresponding to the name of the CCN message; an expiration of a time to live of a pending interest table (PIT) entry that corresponds to the CCN message received as part of the interest return message; an unspecified reason for rejection; and a CCN message whose maximum transmission unit (MTU) is greater than a prescribed minimum MTU.

In some embodiments, the data structure comprises: a new fixed header that indicates that the message is associated with an interest return message, where the new fixed header includes a length of a payload field from the CCN message; an interest return header that indicates a reason for the interest return message; and an encapsulation header that indicates an original fixed header and one or more optional headers from the CCN message, where the encapsulation header includes the length of the header fields from the CCN message.

In some embodiments, the system generates an authenticator for the interest return message, where the authenticator is based on one or more fields of the interest return message and a shared secret key previously agreed upon by the first node and the second node. The system includes the authenticator as part of the pre-pended data structure when transmitting the interest return message to the second node.

BRIEF DESCRIPTION OF THE FIGURES

FIG. 6A illustrates an exemplary format of a CCN interest message and a corresponding CCN interest return message, in accordance with an embodiment of the present invention.

In the figures, like reference numerals refer to the same figure elements.

DETAILED DESCRIPTION

Figure 1:
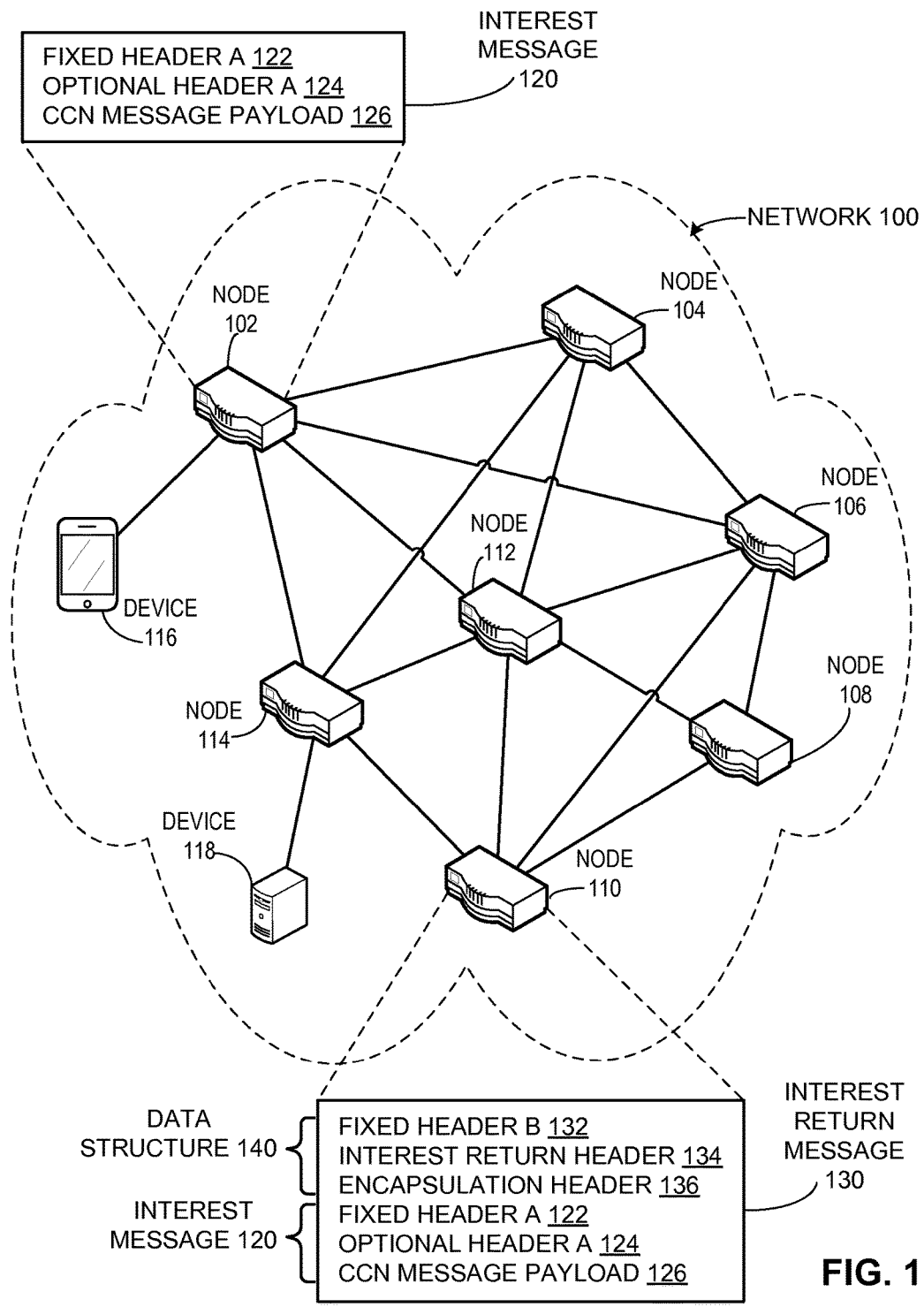
FIG. 1 illustrates an exemplary network that facilitates processing of error-condition information associated with an interest message transmitted over the network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which facilitates processing of error-condition information associated with a content-centric networking (CCN) message, such as an interest message, transmitted over a network. During operation, a first CCN node receives an interest message and detects an error condition while processing the interest. The error condition can include: no available route to the name of the interest; an expiration of an entry in a Pending Interest Table (PIT); the maximum transmission unit (MTU) of the interest does not conform to the required minimum; and other rejections that can be based on, e.g., internal capacity limits, policy settings, and administrative prohibitions. The CCN node at which the error condition occurs creates an interest return message (also referred to generally as a control message) by pre-pending a data structure to the original interest message, leaving the original interest message intact. The pre-pended data structure includes the error condition and additional headers. In some embodiments, the data structure includes an interest return authenticator which is generated by each node that creates or forwards an interest return message. The CCN node then forwards the interest return message, which includes the pre-pended data structure and the original interest message, on a reverse path on which the interest has previously traveled.

An upstream CCN node receives the interest return message and processes the interest return message based on the error condition included in the pre-pended data structure. For example, if the error condition indicates that there is no route for the interest, the upstream CCN node can determine that a corresponding entry resides in the PIT, and, if an alternative forwarding path exists, the upstream CCN node can forward the interest on the alternative forwarding path and discard the interest return message. If there is no alternative forwarding path, the upstream CCN node can remove the PIT entry and forward the interest return message to the previous hop in the reverse data path for the interest. If the interest return message includes an authenticator, the upstream CCN node can authenticate the packet before processing the interest return message.

The following terms are used to describe the CCN architecture:

Content Object:

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814.

A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest:

A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175.

Exemplary Network and Communication

FIG. 1 illustrates an exemplary network 100 that facilitates processing of error-condition information associated with an interest message transmitted over a network, in accordance with an embodiment of the present invention. Network 100 can include a client device 116, a content producing device 118, and a router or other forwarding device at nodes 102, 104, 106, 108, 110, 112, and 114. A node can be a computer system, an end-point representing users, and/or a device that can generate interests or originate content. For example, CCN node 102 can generate an interest message 120 in a piece of content, where interest message 120 includes a fixed header A 122, an optional header A 124, and a CCN message payload 126. Interest message 120 is transmitted to intermediate CCN router 104, on to intermediate CCN router 106, and subsequently on to CCN router 110. CCN router 110 receives interest message 120 and determines that interest message 120 triggers an error condition. Router 110 generates an interest return message 130 by pre-pending a data structure 140 to interest message 120. Data structure 140 includes a fixed header B 132, an interest return header 134, and an encapsulation header 136. Data structure 140 can also include an interest return authenticator which is generated by each router that creates or forwards an interest return message. CCN router 110 then transmits interest return message 130 on the reverse path as the interest, e.g., to CCN router 106.

Upon receiving interest return message 130, CCN router 106 can process interest return message 130 based on the error condition included in pre-pended data structure 140. CCN router 106 can determine if an entry for the interest exists in its Pending Interest Table (PIT). If it does, CCN router 106 can either determine an alternative forwarding path for interest message 120 (e.g., CCN router 108 may be listed as an alternative forwarding path in the PIT) or forward interest return message 130 to the previous hop in the CCN routing path (e.g., CCN router 104).

Receiving Interest and Generating Interest Return

Figure 2:
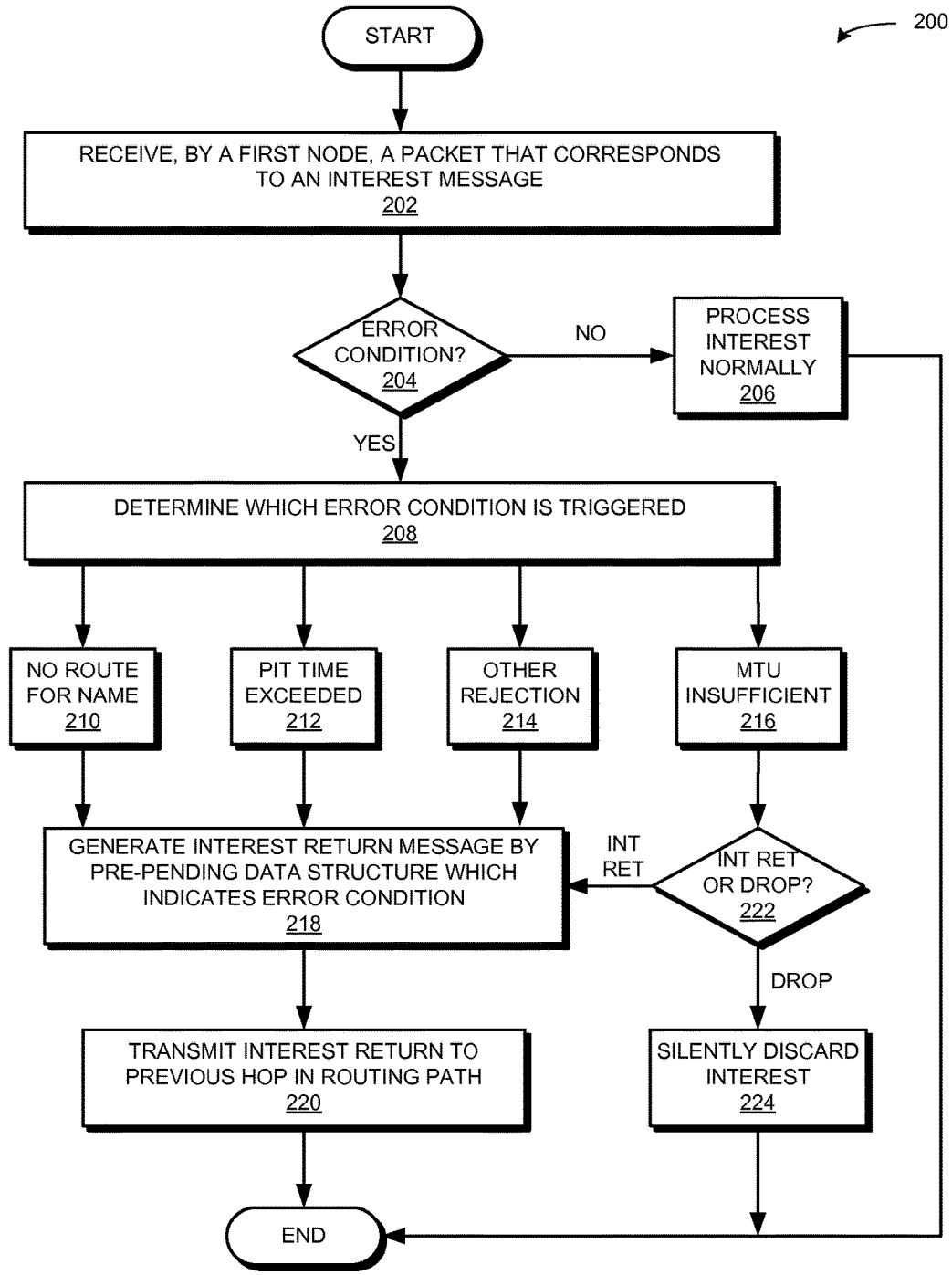
FIG. 2 presents a flow chart illustrating a method for processing an interest packet that triggers an error condition by generating and transmitting an interest return message, in accordance with an embodiment of the present invention.

FIG. 2 presents a flow chart 200 illustrating a method for processing an interest packet that triggers an error condition by generating and transmitting an interest return message, in accordance with an embodiment of the present invention. During operation, the system receives, by a first node (e.g., an intermediate CCN router), a packet that corresponds to an interest in a piece of content (operation 202). The first node determines whether an error condition is triggered by the interest (decision 204). If no error condition is triggered, the system processes the interest normally (e.g., as described in U.S. patent application Ser. No. 12/338,175) (operation 206). If an error condition is triggered (decision 204), the system determines which error condition is triggered (operation 208). Error conditions can include: no available route for the name of the interest ("no route for name"); an expiration of an entry in a Pending Interest Table (PIT) ("PIT time exceeded"); the maximum transmission unit (MTU) of the interest does not conform to the required minimum ("MTU insufficient"); and other unspecified rejections ("other rejection").

If the error condition triggered is no route for name (operation 210), PIT time exceeded (operation 212), or other rejection (operation 214), the system generates an interest return message by pre-pending a data structure to the interest message, where the data structure indicates the triggered error condition (operation 218). In some embodiments, the error condition of PIT time exceeded is used only for testing the network and is not used as an error condition by CCN forwarders when processing interest messages. The first node then transmits the interest return message to the previous hop in the reverse routing path (for example, a previous intermediate CCN router or the originating CCN node).

If the error condition triggered is MTU insufficient (operation 216), the system determines whether to generate an interest return message or drop the packet (decision 222). In some embodiments, this error condition indicates that the interest requires fragmentation. End-to-end CCN fragmentation is described in U.S. patent application Ser. Nos. 14/065,691 and 14/067,587.

If the system determines to generate an interest return message, the first node pre-pends to the interest message a data structure which indicates the error condition (operation 218) and subsequently transmits the interest return message to the previous hop node in the reverse CCN routing path (operation 220). If the system determines to drop the interest, the first node silently discards the interest (operation 224).

Receiving and Processing Interest Return

Figure 3:
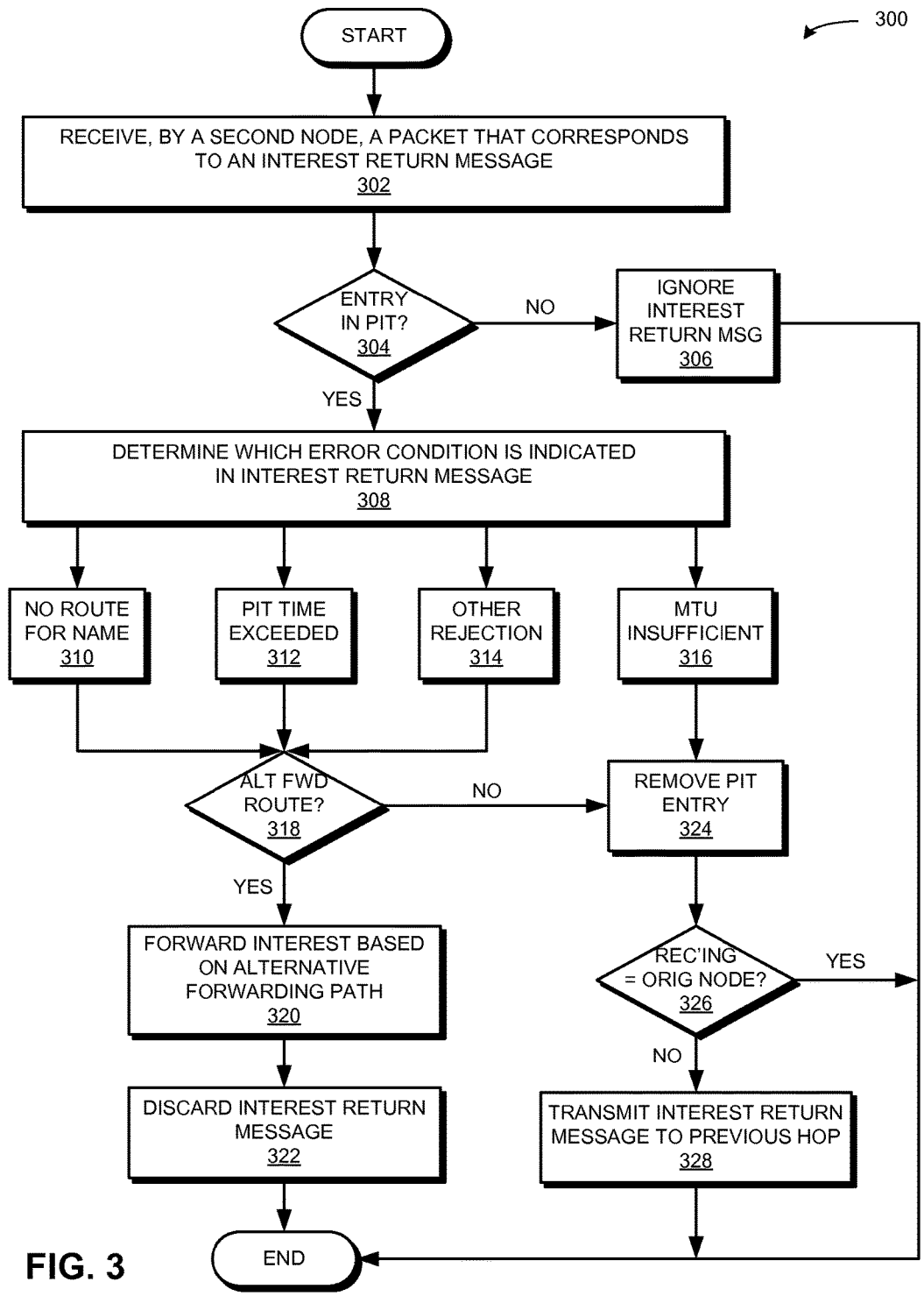
FIG. 3 presents a flow chart illustrating a method for receiving and processing an interest return message, in accordance with an embodiment of the present invention.

FIG. 3 presents a flow chart 300 illustrating a method for receiving and processing an interest return message, in accordance with an embodiment of the present invention. During operation, the system receives, by a second node (e.g., an upstream CCN forwarder in the reverse data path for the interest), a packet that corresponds to an interest return message (operation 302). The second node determines whether an entry exists in its Pending Interest Table (PIT) that corresponds to the name or HSVLI indicated in the interest message (decision 304). If a PIT entry does not exist, the second node ignores the interest return message (operation 306). If a PIT entry does exist, the second node determines which error condition is indicated in the interest return message (operation 308). If the indicated error condition is no route for name (operation 310), PIT time exceeded (operation 312), or other rejection (operation 314), the system determines whether an alternative forwarding route exists for the interest (decision 318). The PIT can contain information relating to one or more paths over which an interest can be forwarded. If an alternative forwarding path exists, the second node will forward the interest based on the alternative forwarding path (operation 322) and discard the interest return message (operation 322). If no alternative forwarding path exists (decision 318) or if the indicated error condition is MTU insufficient (operation 316), the second node removes the corresponding PIT entry (operation 324). If the second node (also referred to as the receiving node) is the node that originated the interest (decision 326), the method terminates. If the second node is not the originating node, the second node transmits the interest return message to the previous hop CCN node (operation 328).

Generating Interest Return Authenticator

Figure 4:
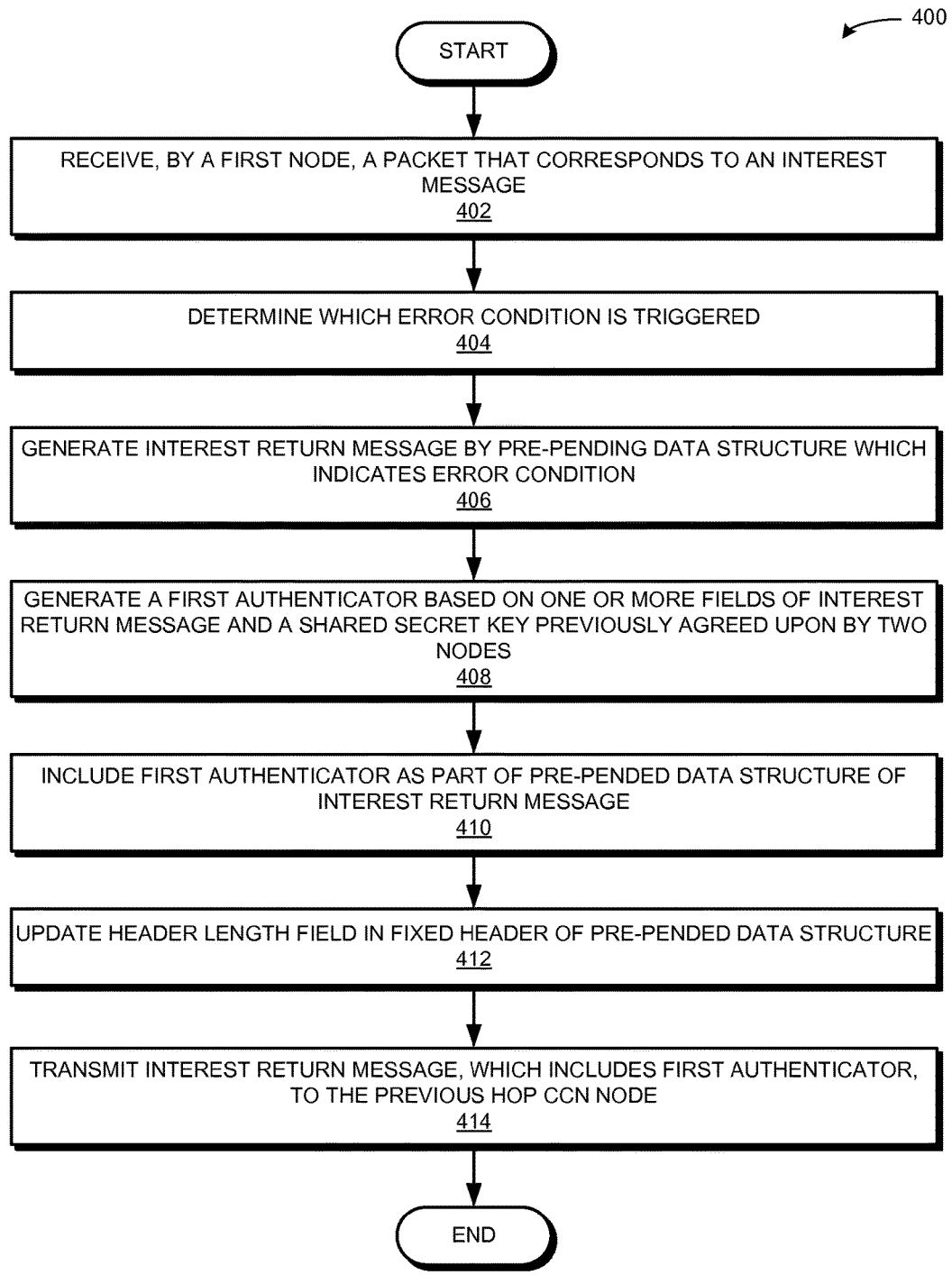
FIG. 4 presents a flow chart illustrating a method for generating, authenticating, and transmitting an interest return message, in accordance with an embodiment of the present invention.

FIG. 4 presents a flow chart 400 illustrating a method for generating, authenticating, and transmitting an interest return message, in accordance with an embodiment of the present invention. During operation, the system receives, by a first node, a packet that corresponds to an interest message (operation 402), determines which error condition is triggered (operation 404), and generates an interest return message by pre-pending a data structure to the interest message, where the data structure indicates the error condition (operation 406). The first node generates an authenticator based on one or more fields of the interest return message and a shared secret key previously agreed upon in a secret key exchange between the first node and a second peer node (operation 408). The authenticator is included as part of the pre-pended data structure of the interest return message (see FIG. 7 below and related discussion) (operation 410). In addition, the first node updates a header length field in a fixed header of the pre-pended data structure (see FIGS. 6A, 6B, and 7) (operation 412). Subsequently, the first node transmits the interest return message, which includes the first authenticator, to the previous hop CCN node (operation 414).

Authenticating Interest Return Message

Figure 5:
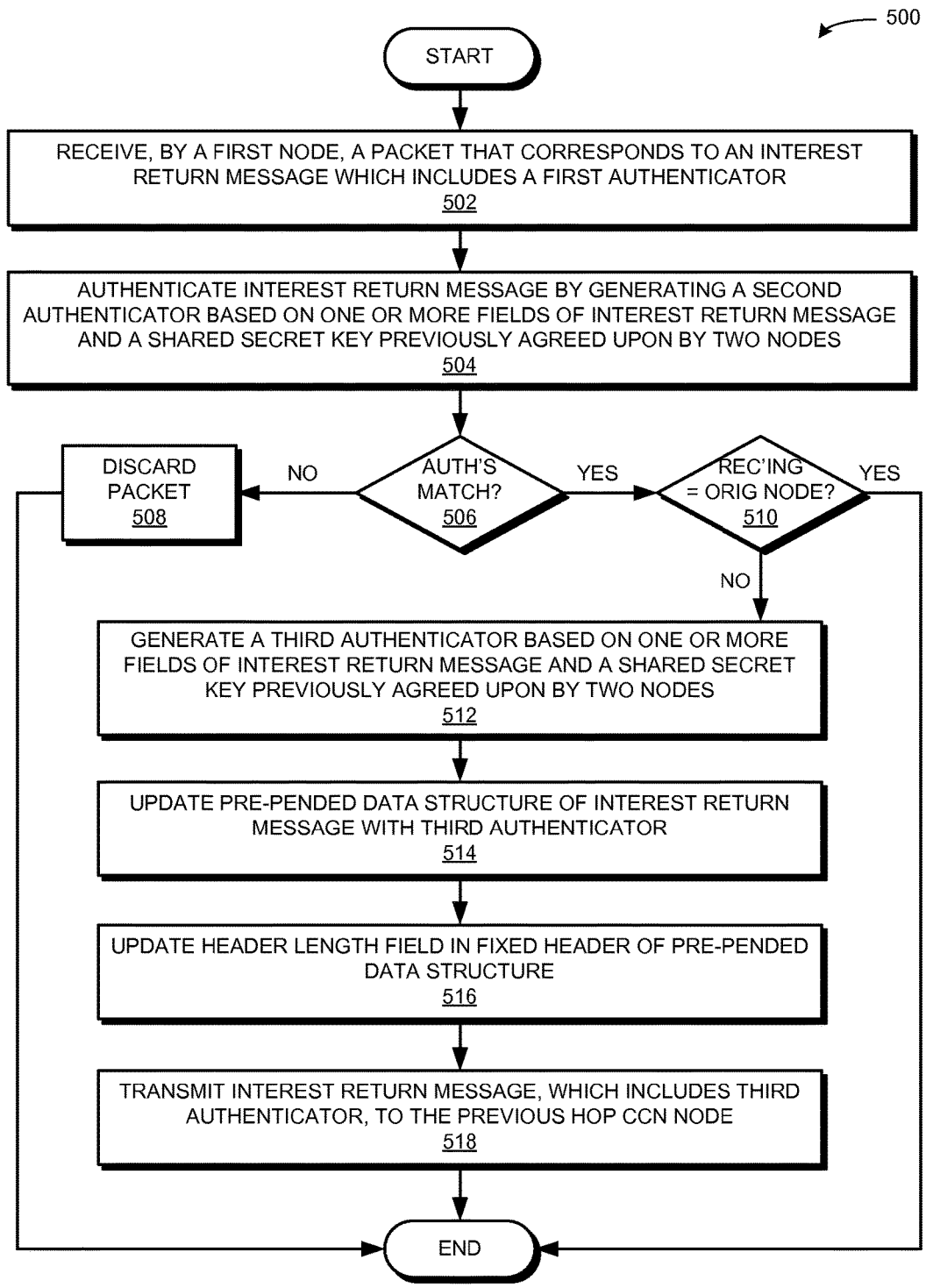
FIG. 5 presents a flow chart illustrating a method for receiving and authenticating an interest return message, in accordance with an embodiment of the present invention.

FIG. 5 presents a flow chart 500 illustrating a method for receiving and authenticating an interest return message, in accordance with an embodiment of the present invention. During operation, a second node (e.g., a CCN forwarder) receives a packet from a first node (e.g., a sending CCN node) that corresponds to an interest return message, where the interest return message includes a first authenticator (operation 502). The second node authenticates the interest return message by generating a second authenticator based on one or more fields of the interest return message and a shared secret key previously agreed upon by the second node and the sending node (operation 504). The second node determines whether the second authenticator matches the first authenticator (decision 506). If they do not match, the second node discards the packet, indicating an authentication failure (operation 508). If the second authenticator does match the first authenticator, then the system proceeds with operations (not shown in FIG. 5) depicted and described in relation to FIG. 3 (operations 304-324). More specifically, the second node determines if a corresponding PIT entry exists for the interest (decision 304), determines which error condition is indicated in the interest return message (operation 308), and, based on the error condition (operations 310, 312, 314, and 316) and whether there is an alternative forwarding path (decision 318), either forwards the interest and discards the interest return message (operations 320 and 322) or removes the PIT entry (operations 316 and 324).

Returning to FIG. 5, the second node (also referred to as the receiving node) determines whether it is the node that originated the interest (decision 510). If the receiving node is the originating node, the method terminates. If the receiving node is not the originating node, the second node generates a third authenticator based on one or more fields of the interest return message and a shared secret key previously agreed upon by the second node and another peer node (operation 512). The third authenticator is included as part of the pre-pended data structure of the interest return message (see FIG. 7 below and related discussion) (operation 514). In addition, the second node updates a header length field in a fixed header of the pre-pended data structure (see FIGS. 6A, 6B, and 7) (operation 516). Subsequently, the second node transmits the interest return message, which includes the third authenticator, to the previous hop CCN node (operation 518).

Exemplary Format of Interest and Interest Return

FIG. 6A illustrates an exemplary format of a CCN interest message 600 and a corresponding CCN interest return message 630, in accordance with an embodiment of the present invention. In some embodiments, CCN interest message 600 and CCN interest return message 630 are formatted with serialized sets of Type Length Value (TLV) fields. CCN interest message (INT) 600 can include a fixed header A (FHA) 660, an optional header A (OHA) 662, and a CCN payload (PL) 664. FHA 660 can include: a version 602 field that indicates the version of the relevant protocol; a packet type 604 field that indicates the type of CCN packet (e.g., interest, content object, or interest return); an original payload length 606 field that indicates the length of PL 664; a hop limit 608 field that indicates the remaining number of hops and can be decremented at each hop until it reaches zero; a reserved 610 field; and an original header length 612 field that indicates the length of OHA 662. OHA 662 can include an optional set of TLV fields relating to the original interest, e.g., priority, quality of service, or other markers. PL 664 can include: a field type 616 field that indicates the type of CCN message (e.g., interest or content object); a message length 618 field that indicates the length of the CCN message; and a CCN message payload 620 field that contains the payload of the CCN message.

CCN interest return message 630 can include a pre-pended data structure 680 and interest message (INT) 600. Data structure 680 can include a fixed header B (FHB) 666, an interest return header (IRH) 668, and an encapsulation header (EH) 670. FHB 666 contains similar fields as FHA 660: a version 632 field that indicates the version of the relevant protocol; a packet type 634 field that indicates the type of CCN packet (e.g., interest return); an original payload length 636 field that indicates the length of PL 664; a hop limit 638 field that indicates the remaining number of hops and can be decremented at each hop until it reaches zero; and a reserved 630 field. FHB 666 also contains a header length 642 field that indicates the length of OHA 662 plus an additional 20 bytes for the summation of the lengths of FHA 660 (8 bytes), EH 670 (4 bytes), and IRH 668 (8 bytes). IRH 668 can include: a field type 644 field which indicates an interest return; a length 646 field that indicates the length of the following fields; a reason 648 field that indicates the reason for the interest return; and a reserved 650 field. EH 670 can include: a field type 652 field which indicates an encapsulation header; and a header length 654 field that indicates the length of OHA 662 plus an additional 8 bytes for the length of FHA 660. EH 670 thus encapsulates FHA 660 and OHA 662.

CCN interest return message 630 maintains compatibility with the TLV format of fixed header A 660, optional header A 662, and the CCN message body payload 664. For example, CCN interest return message 630 can be depicted as including FHB 666, an optional header (OHB) 690, and PL 664. OHB 690 includes: IRH 668 and EH 670 of pre-pended data structure 680; and FHA 660 and OHA 662 of interest message (INT) 600. Because data structure 680 is simply pre-pended to INT 600, original payload length 636 in FHB 666 of interest return message 630 remains the same as original payload length 606 in FHA 660 of INT 600. Furthermore, the system does not need to rewrite the original interest, thus facilitating processing of error-condition information when transmitting an interest over a network.

Figure 6B:
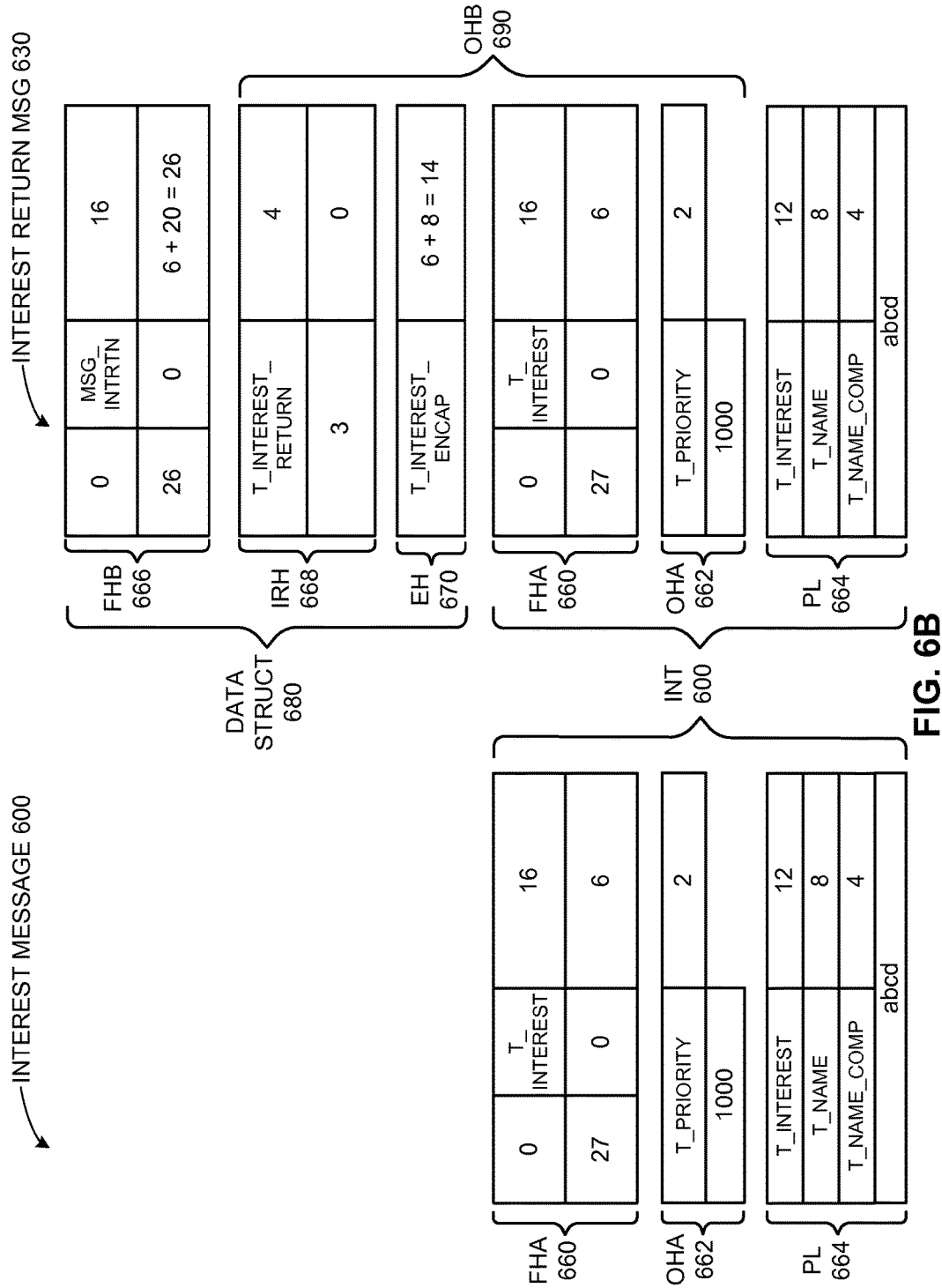
FIG. 6B illustrates an exemplary CCN interest message and corresponding CCN interest return message return message, in accordance with an embodiment of the present invention.

FIG. 6B illustrates an exemplary CCN interest message and corresponding CCN interest return message return message, in accordance with an embodiment of the present invention. The values in FIG. 6B correspond to the fields described above in relation to FIG. 6A. For example, FHA 660 can include: a version that indicates a protocol corresponding to "0"; a packet of type "T_INTEREST"; a payload length of "16"; a hop limit of "27"; a reserved field of "0"; and an original header length of "6". OHA 662 can include a type "T_PRIORITY" with a length of "2" and a value of "1000." PL 664 can include a field type of "T_IN- TEREST" with a length of "12", which includes a type "T_NAME" of length "8", and a value of {type "T_NAME_COMP" of length "4" and a value of "abcd"}.

FHB 666 can include: a version field indicating the same protocol corresponding to "0" as from FHA 660; a packet of type "MSG_INTRTN" to indicate an interest return message; a payload length of "16"; a hop limit that has been decremented to "26"; a reserved field of "0"; and a header length that includes OHA 662 (6 bytes) plus an additional fixed 20 bytes for a value of "26". IRH 668 can include: a packet of type "T_INTEREST_RETURN" with a length of "4" and a value of "3" which corresponds to the reason of unspecified rejection; and a reserved field of value "0". EH 670 can include: a field of type "T_INTEREST_ENCAP" with a header length that includes the length of OHA 662 (6 bytes) plus an additional 8 bytes for a value of "14".

Exemplary Format of Interest Return Authenticator

Figure 7:
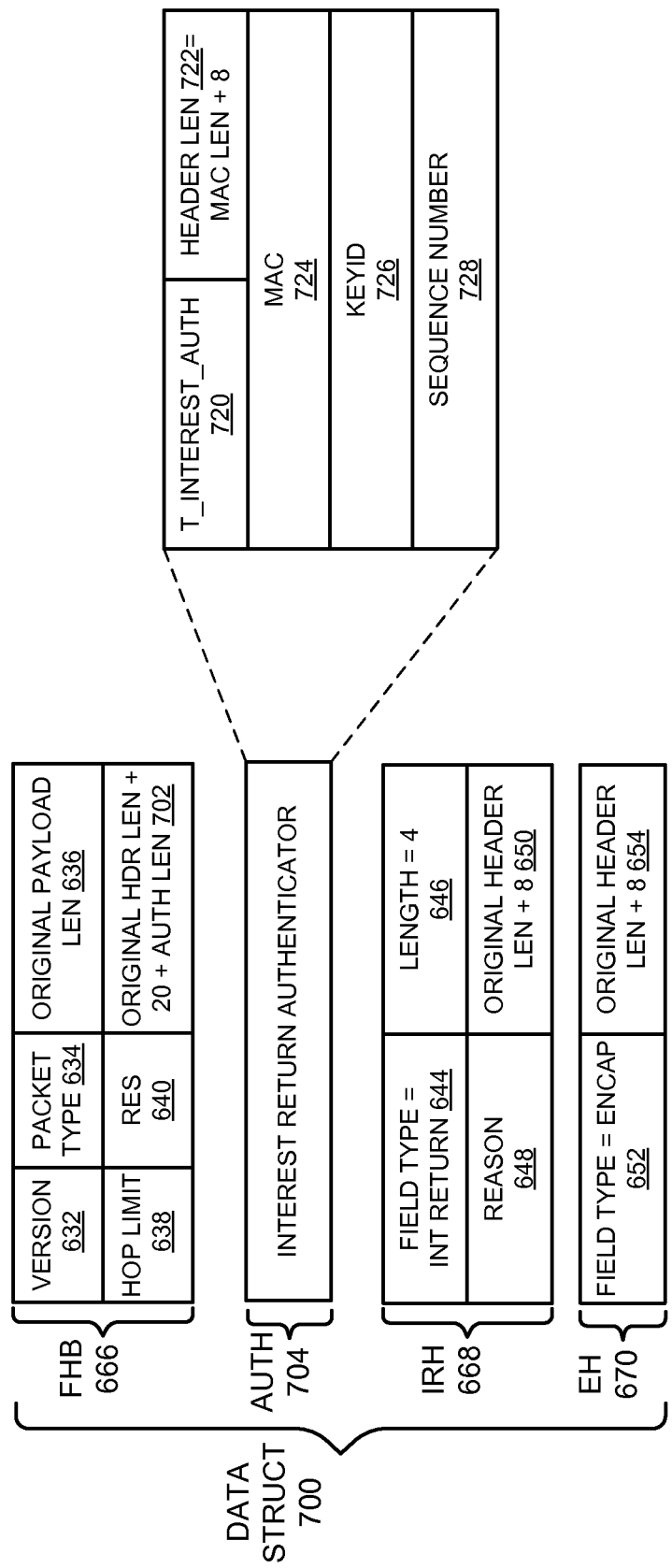
FIG. 7 illustrates an exemplary format for a CCN interest return message that includes an interest return authenticator, in accordance with an embodiment of the present invention.

FIG. 7 illustrates an exemplary format for a pre-pended data structure 700 of a CCN interest return message that includes an interest return authenticator, in accordance with an embodiment of the present invention. Data structure 710 includes a fixed header B (FHB) 666, an authenticator (AUTH) 704, an interest return header (IRH) 668, and an encapsulation header (EH) 670. In some embodiments, a CCN forwarder authenticates an interest return message by negotiating a secret key with each of its peer nodes, using a peer-to-peer key exchange protocol. Each peer node thus possesses a unique 32-bit keyid that is negotiated as part of the key exchange protocol. The keyid identifies the specific peer and secret key. In some embodiments, a CCN node authenticates the interest return message by generating an authenticator based on one or more fields of the interest return message and the secret key. The authenticator can be based on a message authentication code (MAC) that is a cryptographic hash which takes as inputs the shared secret key and the following fields of the interest return message: the interest return header (IRH 668); the encapsulation header (EH 670); and the payload from the original interest message (PL 664).

FHB 666, IRH 668, and EH 670 shown as part of data structure 700 are described above in relation to FIG. 6A. Note that header length 702 field of data structure 700 includes the length of the original header, the length of AUTH 704, and an additional 20 bytes. AUTH 704 can include: a type 720 field of value "T_INTEREST_AUTH"; a length 722 field which includes the length of a message authentication code (MAC) plus an additional 8 bytes for the sum of a 4-byte keyid 726 field and a 4-byte sequence number 728 field; a value 724 field that contains the MAC; the keyid 726 field; and the sequence number 728 field.

Exemplary Computer and Communication System

Figure 8:
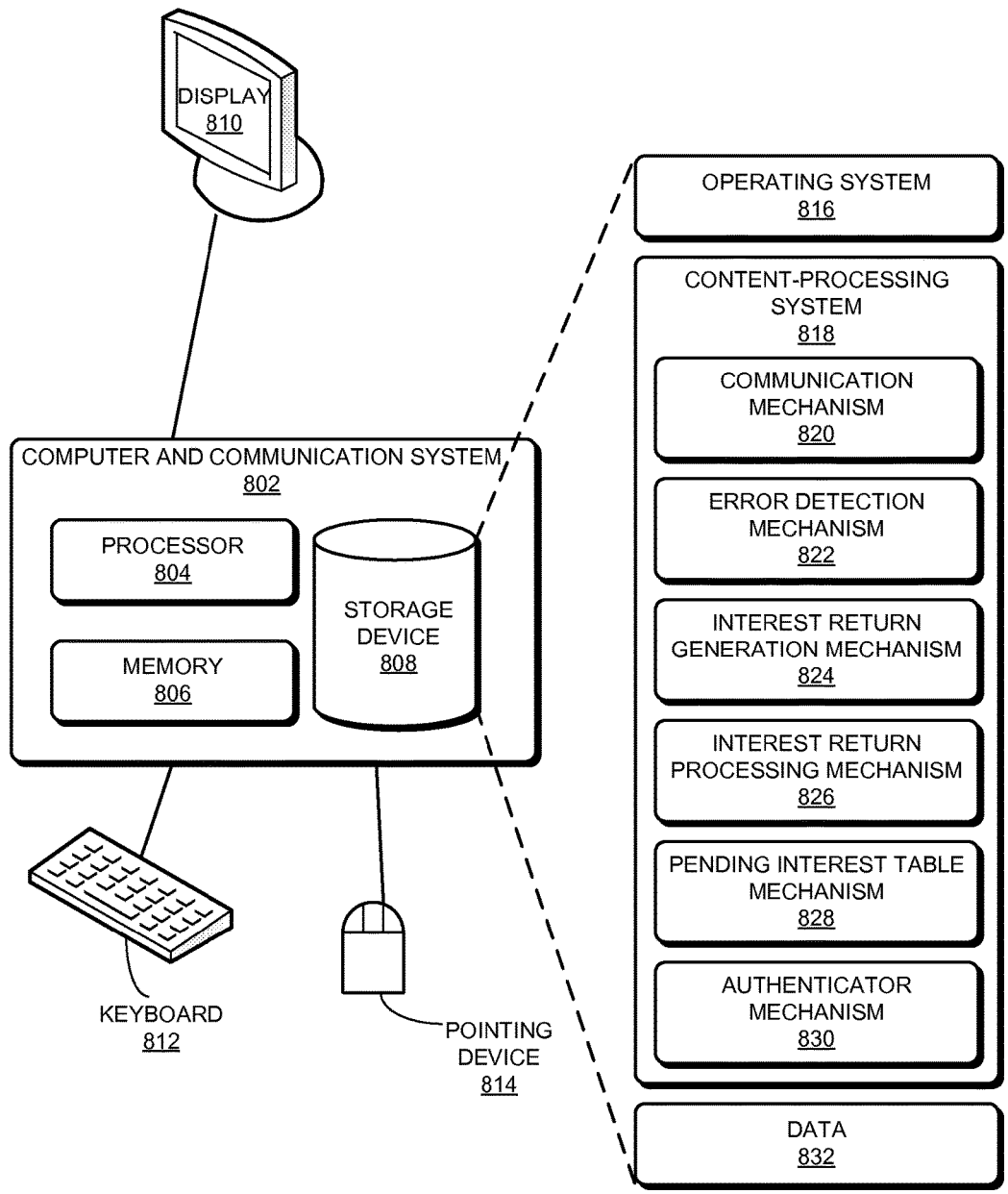
FIG. 8 illustrates an exemplary computer and communication system that facilitates processing of error conditions associated with an interest message transmitted over the network, in accordance with an embodiment of the present invention.

FIG. 8 illustrates an exemplary computer and communication system 802 that facilitates processing of error-condition information associated with an interest message transmitted over the network, in accordance with an embodiment of the present invention. Computer and communication system 802 includes a processor 804, a memory 806, and a storage device 808. Memory 806 can include a volatile memory (e.g., RAM) that serves as a managed memory, and can be used to store one or more memory pools. Furthermore, computer and communication system 802 can be coupled to a display device 810, a keyboard 812, and a pointing device 814. Storage device 808 can store an operating system 816, a content-processing system 818, and data 832.

Content-processing system 818 can include instructions, which when executed by computer and communication system 802, can cause computer and communication system 802 to perform methods and/or processes described in this disclosure. Specifically, content-processing system 818 may include instructions for receiving a packet that corresponds to a content-centric network (CCN) message, where a name for the CCN message is a hierarchically structured variable-length identifier (HSVLI) which comprises contiguous name components ordered from a most general level to a most specific level (communication mechanism 820). Content-processing system 818 can also include instructions for determining whether a CCN message triggers an error condition (error detection mechanism 822). Content processing system 818 can include instructions for generating an interest return message by pre-pending a data structure to the CCN message, where the data structure indicates the error condition (interest return generation mechanism 824).

Content processing system 818 can further include instructions for receiving an interest return message, where the CCN message is an interest message (communication mechanism 820), and determining whether a pending interest table (PIT) contains an entry corresponding to the interest message and removing the entry from the PIT (pending interest table mechanism 828). Content processing system 818 can include instructions for forwarding the interest return message on a reverse path as the interest (communication 826). Content processing system 818 can include instructions for determining whether an alternative forwarding path for the entry exists (pending interest table mechanism 828) and also forwarding the interest message to the next hop node based on the alternative forwarding path (communication mechanism 820). Content processing system 818 can also include instructions for discarding an interest return message (interest return processing mechanism 826).

Content processing system 818 can also include instructions for generating an authenticator for the interest return message, where the authenticator is based on one or more fields of the interest return message and a shared secret key previously agreed upon by two nodes in the network (authenticator mechanism 830). Content processing system 818 can include instructions for including the authenticator as part of the interest return message when transmitting the interest return message to another node (interest return generation mechanism 830).

Data 832 can include any data that is required as input or that is generated as output by the methods and/or processes described in this disclosure. Specifically, data 832 can store at least: a packet that corresponds to a content-centric network (CCN) message; a name for the CCN message that is a hierarchically structured variable length identifier (HSVLI) which comprises contiguous name components ordered from a most general level to a most specific level; a CCN message that is an interest message; a packet that corresponds to an interest return message; an indication of an error condition corresponding to no available forwarding route corresponding to the name of the CC N message or interest message; an indication of an error condition corresponding to an expiration of a time to live of a pending interest table (PIT) entry that corresponds to the CCN message received as part of the interest return message; an indication of an error condition corresponding to an unspecified reason for rejection; and an indication of an error condition corresponding to a CCN message whose maximum transmission unit (MTU) is greater than a prescribed minimum MTU; a pending interest table (PIT); an entry in the PIT that corresponds to the interest message or interest return message; an alternative forwarding path for an interest; a data structure that includes one or more of a fixed header, an interest return header, an authenticator, and an encapsulation header; a fixed header that indicates that the message is associated with an interest return message, where the fixed header includes a length of a payload field from the CCN message; an interest return header that indicates a reason for the interest return message; an encapsulation header that indicates an original fixed header and one or more optional headers from the CCN message, where the encapsulation header includes the length of the header fields from the CCN message; a secret key; a message authentication code (MAC) or other authenticator for the interest return message which is based on one or more fields of the interest return message and a secret key.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for forwarding packets, the method comprising:
   receiving, by a first node, a packet corresponding to a content-centric network (CCN) message, wherein a name for the CCN message is a hierarchically structured variable length identifier (HSVLI) comprising contiguous name components ordered from a most general level to a most specific level;
   responsive to detecting an error condition while processing the CCN message, generating an interest return message which includes a data structure and a copy of the CCN message, wherein the data structure is prepended to the copy of the CCN message, wherein the data structure comprises a fixed header that includes a length of a payload field from the CCN message, an interest return header indicating the error condition, and an encapsulation header indicating an original fixed header and one or more optional headers from the CCN message, wherein the encapsulation header includes a header length field from the CCN message; and
   transmitting the interest return message to a second node.

2. The method of claim 1, wherein the CCN message is an interest message.

3. The method of claim 2, further comprising:
   receiving, by the second node, the interest return message;
   determining whether a pending interest table (PIT) contains an entry corresponding to the interest message; and
   responsive to determining the PIT contains the entry:
      removing the entry from the PIT; and
      forwarding the interest return message on a reverse path as the interest message.

4. The method of claim 3, wherein the determining whether the PIT contains the entry is based on the HSVLI of the interest message.

5. The method of claim 2, further comprising:
   receiving, by the second node, the interest return message;
   determining whether a pending interest table (PIT) contains an entry corresponding to the interest message;
   responsive to determining the PIT contains the entry, determining whether an alternative forwarding path for the interest message exists; and
   responsive to determining the alternative forwarding path exists:
      forwarding the interest message to a next hop node based on the alternative forwarding path; and
      discarding the interest return message.

6. The method of claim 1, wherein the error condition is associated with one or more of:
   no available forwarding route corresponding to the name of the CCN message;
   an expiration of a time to live of a pending interest table (PIT) entry corresponding to the CCN message; and
   a maximum transmission unit (MTU) of the CCN message not conforming to a prescribed minimum MTU.

7. The method of claim 1, further comprising:
   generating an authenticator for the interest return message, wherein the authenticator is based on one or more fields of the interest return message and a shared secret key previously agreed upon by the first node and the second node; and
   including the authenticator as part of the data structure when transmitting the interest return message to the second node.

8. The method of claim 1, wherein the second node processes the error condition associated with the CCN message transmitted over a network.

9. The method of claim 1, wherein the fixed header comprises a hop limit field that indicates a remaining number of hops.

10. The method of claim 1, wherein the length of the encapsulation header is 4 bytes, and the length of the interest return header is 8 bytes.

11. The method of claim 1, wherein the encapsulation header further indicates a length of the original fixed header from the CCN message plus a length of the one or more optional headers from the CCN message.

12. A computer system for facilitating forwarding of packets, the system comprising:
   a processor; and
   a storage device for storing instructions that, when executed by the processor, cause the processor to perform a method, the method comprising
      receiving, by a first node, a packet corresponding to a content-centric network (CCN) message, wherein a name for the CCN message is a hierarchically structured variable length identifier (HSVLI) comprising contiguous name components ordered from a most general level to a most specific level;
      responsive to detecting an error condition while processing the CCN message, generating an interest return message which includes a data structure and a copy of the CCN message, wherein the data structure is pre-pended to the copy of the CCN message, wherein the data structure comprises a fixed header that includes a length of a payload field from the CCN message, an interest return header indicating the error condition, and an encapsulation header indicating an original fixed header and one or more optional headers from the CCN message, wherein the encapsulation header includes a header length field from the CCN message; and
      transmitting the interest return message to a second node.

13. The computer system of claim 12, wherein the CCN message is an interest message.

14. The computer system of claim 12, wherein the error condition is associated with one or more of:
   no available forwarding route corresponding to the name of the CCN message;
   an expiration of a time to live of a pending interest table (PIT) entry corresponding to the CCN message; and
   a maximum transmission unit (MTU) of the CCN message not conforming to a prescribed minimum MTU.

15. The computer system of claim 12, wherein the method further comprises:
   generating an authenticator for the interest return message, wherein the authenticator is based on one or more fields of the interest return message and a shared secret key previously agreed upon by the first node and the second node; and
   including the authenticator as part of the data structure when transmitting the interest return message to the second node.

16. A non-transitory, computer-readable storage medium storing instructions that, when executed by a computer, cause the computer to perform a method, the method comprising:
   receiving, by a first node, a packet corresponding to a content-centric network (CCN) message, wherein a name for the CCN message is a hierarchically structured variable length identifier (HSVLI) comprising contiguous name components ordered from a most general level to a most specific level;
   responsive to detecting an error condition while processing the CCN message, generating an interest return message which includes a data structure and a copy of the CCN message, wherein the data structure is pre-pended to the copy of the CCN message, wherein the data structure comprises a fixed header that includes a length of a payload field from the CCN message, an interest return header indicating the error condition, and an encapsulation header indicating an original fixed header and one or more optional headers from the CCN message, wherein the encapsulation header includes a header length field from the CCN message; and
   transmitting the interest return message to a second node.

17. The storage medium of claim 16, wherein the CCN message is an interest message.

18. The storage medium of claim 16, wherein the error condition is associated with one or more of:
   no available forwarding route corresponding to the name of the CCN message;
   an expiration of a time to live of a pending interest table (PIT) entry corresponding to the CCN message; and
   a maximum transmission unit (MTU) of the CCN message not conforming to a prescribed minimum MTU.

19. The storage medium of claim 16, wherein the method further comprises:
   generating an authenticator for the interest return message, wherein the authenticator is based on one or more fields of the interest return message and a shared secret key previously agreed upon by the first node and the second node; and
   including the authenticator as part of the pre-pended data structure when transmitting the interest return message to the second node.

* * * * *